(12) United States Patent
Sherman et al.

(10) Patent No.: US 7,079,837 B1
(45) Date of Patent: Jul. 18, 2006

(54) CALLER IDENTIFICATION QUEUE FOR WIRELESS TELEPHONES

(75) Inventors: Stephen Sherman, Alpharetta, GA (US); Corey Feldstein, Powder Springs, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 275 days.

(21) Appl. No.: 09/992,165

(22) Filed: Nov. 6, 2001

(51) Int. Cl.
*H04M 3/42* (2006.01)

(52) U.S. Cl. ............... 455/415; 455/412.2; 455/421; 455/567

(58) Field of Classification Search ........... 455/415, 455/435.1, 433, 567, 461; 379/142.04, 207.15
See application file for complete search history.

(56) References Cited

U.S. PATENT DOCUMENTS

| | | | |
|---|---|---|---|
| 5,265,145 A | 11/1993 | Lim | ........................ 379/88.2 |
| 5,289,542 A | 2/1994 | Kessler | |
| 5,315,650 A | 5/1994 | Smith et al. | |
| 5,386,460 A * | 1/1995 | Boakes et al. | ............. 379/457 |
| 5,425,089 A | 6/1995 | Chan et al. | |
| 5,430,719 A | 7/1995 | Weisser, Jr. | |
| 5,452,346 A | 9/1995 | Miyamoto | |
| 5,481,594 A | 1/1996 | Shen et al. | |
| 5,481,599 A | 1/1996 | MacAllister et al. | ........ 379/101 |
| 5,511,111 A | 4/1996 | Serbetcioglu et al. | |
| 5,530,741 A | 6/1996 | Rubin | |
| 5,546,447 A | 8/1996 | Skarbo et al. | |
| 5,550,905 A | 8/1996 | Silverman | |

(Continued)

FOREIGN PATENT DOCUMENTS

EP  0 821 511 A2  1/1998

(Continued)

OTHER PUBLICATIONS

Copending U.S. Appl. No. 09/888,926, filed Jun. 25, 2002, entitled "Audio Caller Identification".

(Continued)

*Primary Examiner*—Fan Tsang
*Assistant Examiner*—Simon Sing
(74) *Attorney, Agent, or Firm*—Merchant & Gould

(57) ABSTRACT

A method and system are provided for collecting and storing caller identification information associated with a calling party directed to an out of service wireless telephone. When calls are made to a wireless telephone, a determination is made as to whether the telephone is registered for service, that is, whether the telephone can receive calls because it is powered on and is located within a wireless telecommunications service area where it may receive calls. During out of service periods, caller identification information on calls placed to the wireless telephone is stored in an identification queue. Once the wireless telephone is registered for service, stored caller identification information is forwarded to the wireless telephone for presentation to the user of the wireless telephone. Accordingly, the user of the wireless telephone avoids missing telephone calls made to her wireless telephone during the out of service period, and the user may then return the telephone calls at a convenient time.

19 Claims, 3 Drawing Sheets

U.S. PATENT DOCUMENTS

| | | | |
|---|---|---|---|
| 5,619,561 A | 4/1997 | Reese | |
| 5,644,629 A | 7/1997 | Chow | |
| D383,466 S | 9/1997 | Burrell et al. | |
| 5,696,815 A | 12/1997 | Smyk | |
| 5,734,706 A | 3/1998 | Windsor et al. | |
| 5,754,635 A | 5/1998 | Kim | |
| 5,771,281 A | 6/1998 | Batten, Jr. | |
| 5,771,283 A | 6/1998 | Chang et al. | |
| 5,781,621 A | 7/1998 | Lim et al. | |
| 5,796,806 A | 8/1998 | Birckbichler | |
| 5,802,251 A | 9/1998 | Cohen et al. | |
| 5,805,997 A * | 9/1998 | Farris | 455/461 |
| 5,841,838 A | 11/1998 | Itoh et al. | |
| 5,841,850 A | 11/1998 | Fan | |
| 5,859,903 A | 1/1999 | Lee | |
| 5,901,212 A | 5/1999 | True et al. | |
| 5,903,636 A | 5/1999 | Malik | |
| 5,905,794 A | 5/1999 | Gunn et al. | |
| 5,915,000 A | 6/1999 | Nguyen et al. | |
| 5,930,701 A * | 7/1999 | Skog | 455/415 |
| 5,940,484 A | 8/1999 | DeFazio et al. | |
| 5,946,636 A | 8/1999 | Uyeno et al. | |
| D413,605 S | 9/1999 | Thomas | |
| 5,949,865 A * | 9/1999 | Fusinato | 379/221.09 |
| 5,953,399 A | 9/1999 | Farris et al. | |
| 5,963,626 A | 10/1999 | Nabkel | 379/88.2 |
| 5,969,647 A | 10/1999 | Mou et al. | |
| 5,970,127 A | 10/1999 | Smith et al. | |
| 5,970,128 A | 10/1999 | Kim | |
| 5,974,309 A * | 10/1999 | Foti | 455/412.1 |
| 5,982,866 A | 11/1999 | Kowalski | |
| 5,999,613 A | 12/1999 | Nabkel et al. | 379/142.04 |
| 6,009,321 A * | 12/1999 | Wang et al. | 455/410 |
| 6,021,188 A | 2/2000 | Meg | |
| 6,031,899 A | 2/2000 | Wu | 379/142.01 |
| 6,044,148 A | 3/2000 | Bleile | |
| 6,061,434 A | 5/2000 | Corbett | |
| 6,065,844 A | 5/2000 | Chen | 359/857 |
| 6,101,246 A | 8/2000 | Heinmiller et al. | |
| 6,101,382 A * | 8/2000 | Granberg | 455/414.1 |
| 6,108,630 A | 8/2000 | Kuechler et al. | |
| 6,111,939 A | 8/2000 | Brabanec | |
| 6,137,871 A | 10/2000 | Maier et al. | |
| 6,154,531 A | 11/2000 | Clapper | |
| 6,160,876 A | 12/2000 | Moss et al. | |
| 6,163,691 A | 12/2000 | Buettner et al. | |
| 6,173,049 B1 | 1/2001 | Malik | |
| 6,178,232 B1 | 1/2001 | Latter et al. | |
| D437,879 S | 2/2001 | Weinandt | |
| 6,219,407 B1 | 4/2001 | Kanevsky et al. | |
| 6,243,448 B1 | 6/2001 | Corbett et al. | |
| 6,243,461 B1 | 6/2001 | Hwang | |
| 6,266,399 B1 | 7/2001 | Weller et al. | |
| 6,282,275 B1 | 8/2001 | Gurbani et al. | |
| 6,292,479 B1 | 9/2001 | Bartholomew et al. | |
| 6,292,549 B1 | 9/2001 | Lung et al. | |
| 6,304,644 B1 | 10/2001 | Karnowski | |
| 6,310,943 B1 | 10/2001 | Kowalski | |
| 6,311,057 B1 * | 10/2001 | Barvesten | 455/415 |
| 6,317,488 B1 | 11/2001 | DePond et al. | |
| 6,324,271 B1 | 11/2001 | Sawyer et al. | |
| 6,327,347 B1 | 12/2001 | Gutzmann | 379/88.2 |
| 6,332,021 B1 | 12/2001 | Latter et al. | |
| 6,339,639 B1 | 1/2002 | Henderson | |
| 6,341,161 B1 | 1/2002 | Latter et al. | |
| 6,345,187 B1 | 2/2002 | Berthoud et al. | |
| 6,347,136 B1 | 2/2002 | Horan | 379/88.2 |
| 6,351,637 B1 | 2/2002 | Lee | |
| 6,366,772 B1 | 4/2002 | Arnson | |
| 6,389,124 B1 | 5/2002 | Schnarel et al. | 379/142.01 |
| 6,400,809 B1 | 6/2002 | Bossemeyer, Jr. et al. | 379/88.21 |
| 6,400,947 B1 * | 6/2002 | Bright et al. | 455/433 |
| 6,427,003 B1 | 7/2002 | Corbett et al. | |
| 6,442,262 B1 | 8/2002 | Moss et al. | |
| 6,445,781 B1 | 9/2002 | Heinmiller et al. | |
| 6,449,351 B1 | 9/2002 | Moss et al. | |
| 6,480,589 B1 | 11/2002 | Lee et al. | |
| 6,493,439 B1 | 12/2002 | Lung et al. | |
| 6,496,569 B1 | 12/2002 | Pelletier et al. | |
| 6,496,571 B1 | 12/2002 | Wilson | |
| 6,498,841 B1 | 12/2002 | Bull et al. | |
| 6,529,591 B1 | 3/2003 | Dosani et al. | |
| 6,542,583 B1 | 4/2003 | Taylor | |
| 6,542,591 B1 | 4/2003 | Amro et al. | |
| 6,546,092 B1 | 4/2003 | Corbett et al. | |
| 6,553,110 B1 | 4/2003 | Peng | |
| 6,553,221 B1 * | 4/2003 | Nakamura et al. | 455/415 |
| 6,560,317 B1 | 5/2003 | Quagliana | |
| 6,570,971 B1 | 5/2003 | Latter et al. | |
| 6,574,319 B1 | 6/2003 | Latter et al. | |
| 6,608,891 B1 | 8/2003 | Pelletier et al. | 379/207.02 |
| 6,631,181 B1 | 10/2003 | Bates et al. | |
| 6,639,979 B1 | 10/2003 | Kim | |
| 6,650,743 B1 | 11/2003 | Heinmiller et al. | |
| 6,718,021 B1 | 4/2004 | Crockett et al. | |
| 6,728,355 B1 | 4/2004 | Kowalski | |
| 6,731,727 B1 | 5/2004 | Corbett et al. | |
| 6,748,058 B1 | 6/2004 | Schwend et al. | |
| 6,748,068 B1 | 6/2004 | Walsh et al. | |
| 6,766,003 B1 | 7/2004 | Moss et al. | |
| D494,953 S | 8/2004 | Leung | |
| 6,771,754 B1 | 8/2004 | Pelletier et al. | |
| 6,771,755 B1 | 8/2004 | Simpson | |
| 6,785,301 B1 | 8/2004 | Chapman et al. | |
| 6,785,368 B1 | 8/2004 | Eason et al. | |
| 6,807,267 B1 | 10/2004 | Moss et al. | |
| 6,810,115 B1 | 10/2004 | Fukuda | |
| 6,816,481 B1 | 11/2004 | Adams et al. | |
| 6,826,271 B1 | 11/2004 | Kanabar et al. | |
| 6,831,974 B1 | 12/2004 | Watson et al. | |
| 6,845,151 B1 | 1/2005 | Peng | |
| 2002/0009184 A1 | 1/2002 | Shnier | 379/142.01 |
| 2002/0016748 A1 | 2/2002 | Emodi et al. | 705/26 |
| 2002/0122401 A1 | 9/2002 | Xiang et al. | |
| 2002/0183098 A1 | 12/2002 | Lee et al. | 455/566 |
| 2002/0191755 A1 | 12/2002 | Lew et al. | 379/88.19 |
| 2003/0092384 A1 | 5/2003 | Ross, III | 455/41 |
| 2003/0095650 A1 | 5/2003 | Mize | 379/88.19 |
| 2004/0125929 A1 | 7/2004 | Pope | 379/142.17 |

FOREIGN PATENT DOCUMENTS

| | | |
|---|---|---|
| KR | 2002014945 | 2/2002 |
| WO | WO 97/50225 | 12/1997 |

OTHER PUBLICATIONS

U.S. Official Action dated Dec. 28, 2004 cited in U.S. Appl. No. 09/888,926.

Mize, Gary, Patent Pend. Projected Caller ID Own 50% Look [online], Sep. 10, 2000 [retrieved on Sep. 20, 2000].

Copending U.S. Appl. No. 09/888,832, filed Jun. 25, 2001, entitled "Visual Caller Identification".

U.S. Offical Action dated Sep. 9, 2004 cited in U.S. Appl. No. 09/888,832.

Michael W. Slawson, "Caller ID Basics", http://www.testmark.com/develop/tml_callerid_ent.html, Oct. 31, 2001, 10 pages.

"Talking Caller ID" by Stealth Software, http://www.talkingcallerid.com/, Aug. 31, 2005, 5 pages.

Aastra (quick links), http://www.aasatra.com/products/callerids/voicecallerid/be-6060.html, Aug. 31, 2005, 2 pages.

Aastra (quick links), CNX Audio Conference Bridge, http://www.aastra.com/products/callerids/voicecallerid/be-9090.html, Aug. 31, 2005, 2 pages.

Smarthome, The Caller ID System That Speaks for Itself!, http://www.smarthome.com/5154.html, Aug. 31, 2005, 2 pages.

"Multi-Lingual Text-to-Speech Processor ML2110<", http://www.oki.com/semi/english/ml2110/html, Aug. 31, 2005, 5 pages.

Y. Rekhter et al., "Address Allocation for Private Internets," RFC1918, Silicon Graphics, Inc., Feb. 1996, 8 pages.

K. Egevang et al., "The IP Network Address Translator (NAT)," RFC1631, NTT, May 1994, 8 pages.

M. Handley et al., "SIP: Session Initiation Protocol," RFC2543, Bell Labs, Mar. 1999, 112 pages.

* cited by examiner

CALLER IDENTIFICATION QUEUE FOR WIRELESS TELEPHONES

FIELD OF THE INVENTION

This invention relates to a system and method for providing caller identification information to a wireless telephone for calls placed to the wireless telephone while it is out of service.

BACKGROUND OF THE INVENTION

Operational characteristics of wireless telephones and wireless telephone systems and networks differ from that of wireline systems due to the transient nature of the wireless telephones. Wireless telephones are routinely out of service for a variety of reasons. For example, if the user of a wireless telephone turns the telephone off or if the wireless telephone battery lacks sufficient charge, the wireless telephone will not be capable of receiving incoming calls. Likewise, if the wireless telephone is taken out of the wireless service area, the wireless telephone will not be capable of receiving incoming calls. During such times, the user of an out of service wireless telephone may receive voice mail messages if voice mail services are provisioned on the wireless telephone, or the user of the out of service wireless telephone may simply miss the call altogether.

Wireless telephones that are provisioned for receiving caller identification information typically display the information such as the name and telephone number of the calling party and often the date and time of the call. If the user of the wireless telephone does not answer the call, or if the user of the wireless telephone is currently speaking to another caller, the wireless telephone often will receive caller identification information on the calling party and place that information in a missed call log along with an indication that a call was missed. In either case, the calling party may be routed to the voice messaging service, if any, utilized by the wireless telephone.

A problem occurs, however, when the wireless telephone is out of service. When the wireless telephone is out of service, calls placed to the telephone may be routed through to the voice messaging service of the wireless telephone, but caller identification information is lost and no missed call log is generated for calls attempted to the wireless telephone during the out of service period. Accordingly, when the wireless telephone is returned to service, the user has no indication or record of missed calls during the out of service period.

Therefore, there is a need in the art for method and system for capturing missed call information and for delivering that information to a wireless telephone when the telephone returns to service after an out of service period.

SUMMARY OF THE INVENTION

In accordance with the present invention, the above and other problems are solved by a method and system for collecting and storing caller identification information associated with a calling party directed to an out of service wireless telephone. When calls are made to a wireless telephone, a determination is made as to whether the telephone is registered for service, that is, whether the telephone can receive calls because it is powered on and is located within a wireless telecommunications service area where it may receive calls. During out of service periods, caller identification information on calls placed to the wireless telephone is stored in an identification queue. Once the wireless telephone is registered for service, stored caller identification information is forwarded to the wireless telephone for presentation to the user of the wireless telephone. Accordingly, the user of the wireless telephone avoids missing telephone calls made to her wireless telephone during the out of service period, and the user may then return the telephone calls at a convenient time.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION OF THE PREFERRED EMBODIMENT

The following description of an exemplary embodiment of the present invention is made with reference to the above-described drawings wherein like numerals refer to like parts or components throughout the several figures. The present invention is directed toward a method and system for collecting and storing caller identification information associated with a calling party directed to an out of service wireless telephone. Once the wireless telephone is registered for service where the wireless telephone is powered on and is located within an operational wireless telecommunications service area, stored caller identification information on calls received during the out of service period is forwarded to the wireless telephone for presentation to the user of the wireless telephone. Accordingly, the user of the wireless telephone avoids missing telephone calls made to her wireless telephone during the out of service period, and the user may then return the telephone calls at a convenient time.

Figure 1:
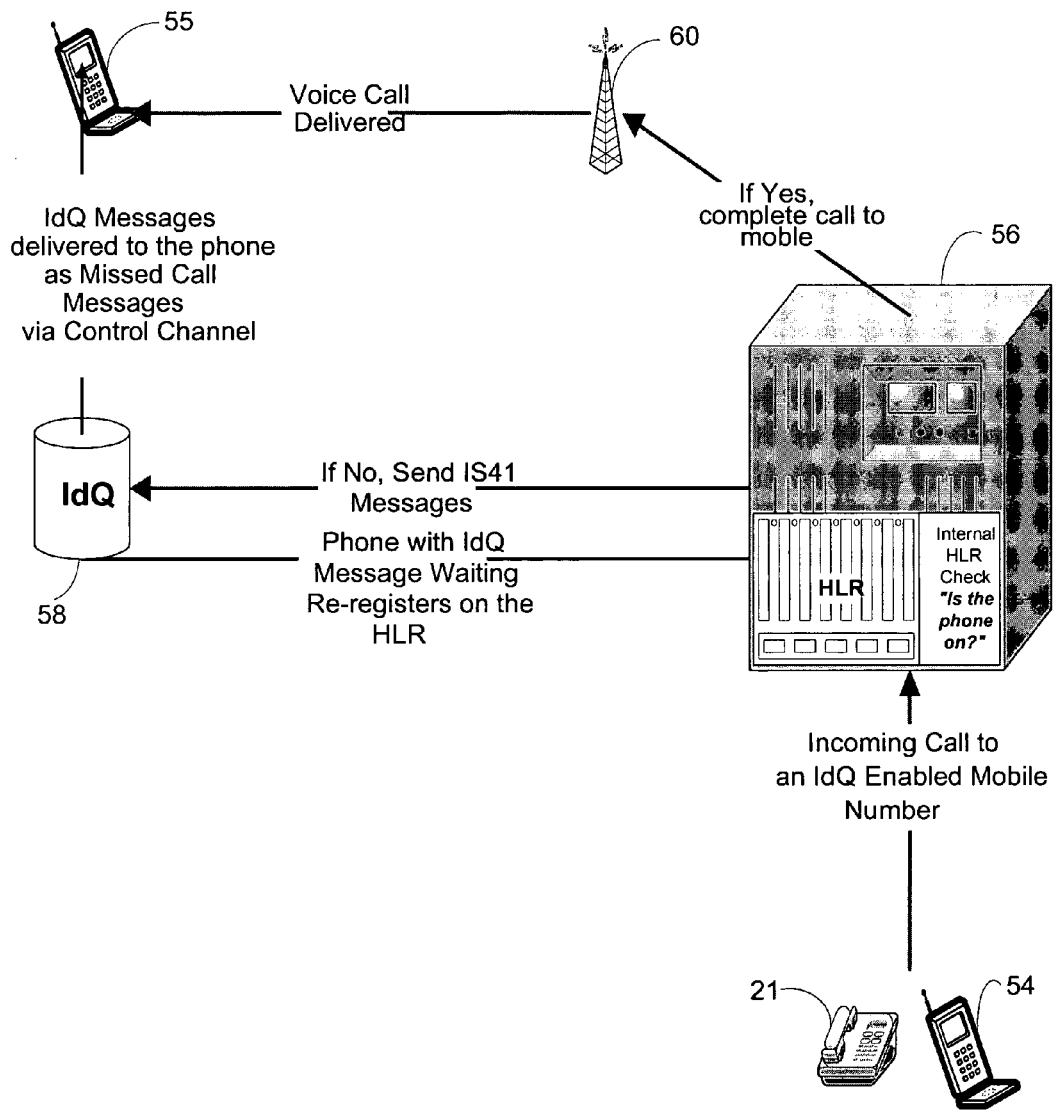
FIG. 1 is a pictorial diagram representing the system architecture of an exemplary embodiment of the present invention.

FIG. 1 is a pictorial diagram representing the system architecture of an exemplary embodiment of the present invention. When a calling party utilizing a landline telephone 21 or a wireless telephone 54 places a call to a wireless telephone 55, as illustrated in FIG. 1, a determination is made at a home location register 56 of the wireless telecommunications service provider for the wireless telephone 55 as to whether the telephone 55 is registered for service. The wireless telephone 55 is registered for service if the telephone is on and is within the service area for receiving calls. That is, if the wireless telephone is switched off, or if the telephone is off due to a dead battery or other malfunction, the home location register will register the telephone as out of service. Likewise, if the telephone has been moved to an area outside the wireless telecommunications service provider area, or if wireless signaling to the wireless telephone 55 has been temporarily interrupted or obstructed, the home location register (HLR) 56 will register the wireless telephone 55 as out of service.

If the wireless telephone 55 is registered for service, the telephone call placed to the wireless telephone 55 is routed to the wireless telephone according to well known call routing procedures in a wireless telephone communications network. An exemplary wireless telecommunications operating environment is described in detail below. It should be understood that if the wireless telephone 55 is provisioned with caller identification services, caller identification information on the calling party will be provided to the wireless telephone 55 with the call. On the other hand, if the wireless telephone 55 is registered as out of service by the HLR 56, caller identification information on the calling party is forwarded to an identification queue (IdQ) 58 for storage.

As soon as the wireless telephone 55 is returned to service, where the telephone is switched to the on position or where the wireless telephone is returned to an operational service area, signaling between the wireless telephone 55 and the HLR 56 causes the wireless telephone to be registered for service by the HLR 56. Once the wireless telephone 55 is registered for service, stored caller identification information on calls missed by the wireless telephone 55 during the out of service period are forwarded to the wireless telephone 55 for presentation to the user.

Exemplary Operating Environment

Figure 2:
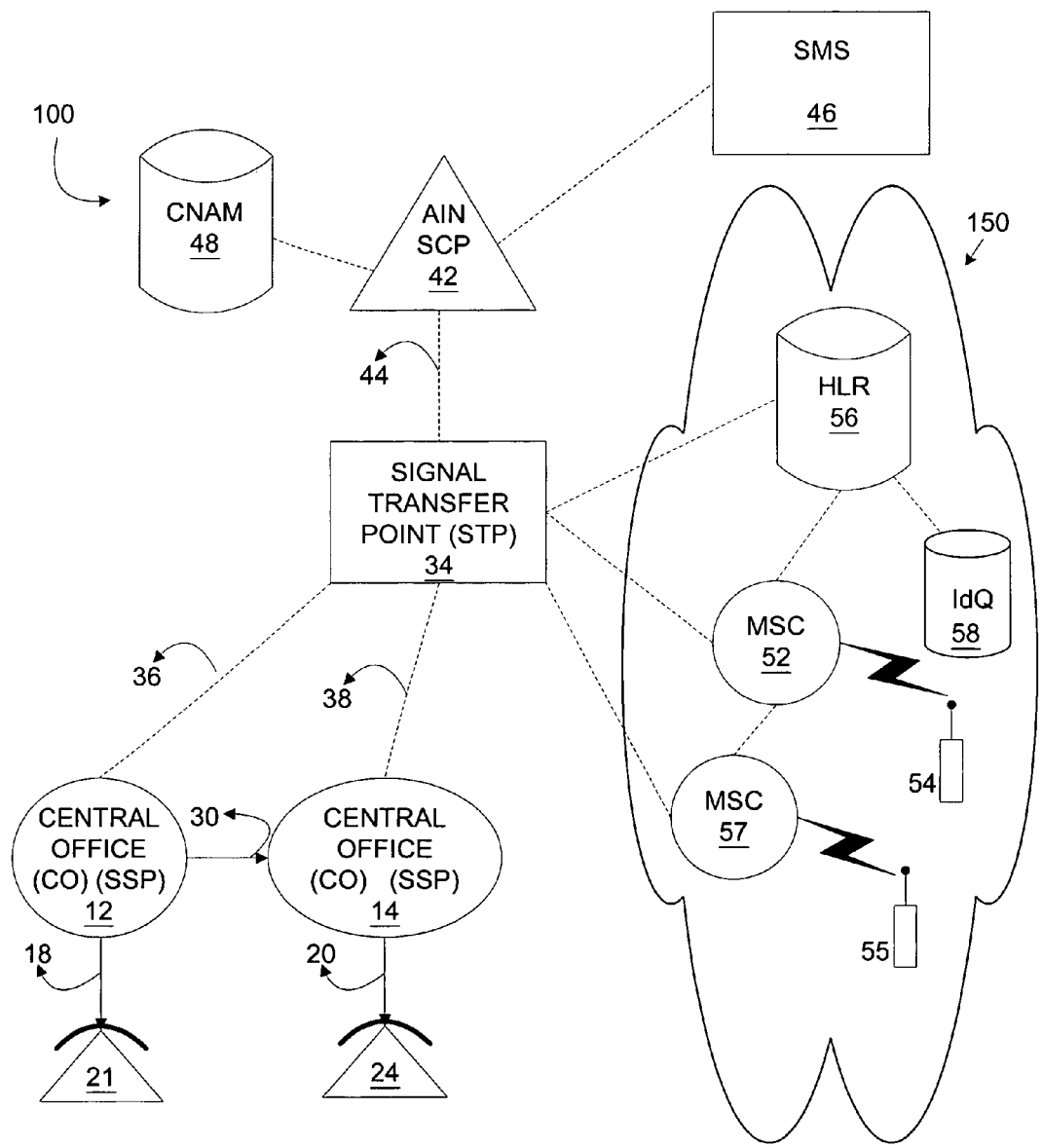
FIG. 2 is a block diagram of a telecommunications network illustrating an exemplary operating environment for the present invention.

It is advantageous to describe an exemplary operating environment in which the current invention may reside. FIG. 2 is a block diagram illustrating components of a telephone network that provides an exemplary operating environment for the present invention. Referring now to the drawings, in which like numerals represent like elements throughout the several figures, aspects of the present invention and the advanced intelligent network (AIN) and an integrated wireless network will be described.

The modern public switched telephone network (PSTN) has separate signaling paths for voice signals (or other customer-utilized communication circuits) and for control signals, which include information transmitted throughout the network to control the connection and disconnection of the voice circuits. The public switched telephone network that evolved in the 1980s incorporated the advanced intelligent network (AIN). Some of the components of the advanced intelligent network are illustrated in FIG. 2. FIG. 2 is a block diagram representing at least a part of the advanced intelligent network (AIN) 100 of a typical local exchange carrier integrated with components of a wireless network 150. The advanced intelligent network (AIN) uses the signaling system 7 (SS7) network for signal or system control message transport. The components thereof are well-known to those skilled in the art. The operation of many of the components of the advanced intelligent network is also described in U.S. Pat. No. 5,430,719 to Weisser, Jr. entitled "Mediation of Open Advanced Intelligent Network Interface by Shared Execution Environment" which is incorporated herein by reference. The SS7 communications protocol is provided in the document entitled "Bell Communications Research Specification of Singaling System 7," Document TR-NWT-000246, Issue 2 (June 1991), plus Revision 1 (December 1991), which is also incorporated herein by reference.

A plurality of central offices are provided in a typical public switched telephone network. As shown in FIG. 2, each central office may include an electronic switch known to those skilled in the art as a service switching point (SSP). These are indicated in FIG. 2 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30 and 32.

As shown in FIG. 2, central offices switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. SSP switches 12 and 14 are connected by a plurality of trunk circuits 30. These are the voice path trunks that interconnect the central offices 12 and 14 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 2.

Much of the intelligence, and the basis for many of the enhanced features of the network, resides in the local AIN service control point (SCP) 42 that is connected to signal transfer point 34 via SS7 data link 44. As is known to those skilled in the art, AIN service control points, such as SCP 42, are physically implemented by relatively powerful fault tolerant computers. Among the functions performed by the service control points is maintenance of network databases used in providing enhanced services. Service control points, such as SCP 42, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

Additional devices for implementing advanced network functions within the AIN 100 are provided by regional STPs (not shown), regional SCPs (not shown), and a service management system (SMS) 46. The STP 34 is connected to the SSPs via connections 36, 38 and 40. Both the regional SCPs and the local SCP 42, which represent a plurality of local SCPs distributed throughout the AIN 100, are connected via respective data links to the SMS 46. The SMS 46 provides a centralized platform for remotely programming the various SCPs of the AIN 100 so that a coordinated information processing scheme may be implemented for the AIN 100. The SMS 46 is implemented by a large general purpose computer and interfaces to business offices of the local exchange carrier and interexchange carriers. SSPs download, on a non-real time basis, billing information to a billing system 50 that is needed in order to appropriately invoice subscribers for the services provided.

The SCP 42 is also connected to a caller name (CNAM) database 48. The CNAM database comprises a plurality of directory numbers along with associated names for the directory numbers. The CNAM database may be used to provide a look-up database to provide caller ID service. The CNAM database may comprises directory numbers from wireline customers as well as wireless customers of wireless network 150.

In operation, the intelligent network elements of the AIN 100, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12 and 14, a relatively small set of triggers are defined at the SSP central office switches for each call.

The message created by an SSP in response to a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well-known to those skilled in the art and will not be further described herein. For more information regarding the AIN protocol, see Bellcore Specification GR-1298-CORE Switching Systems Generic Requirements for AIN 0.1, which is incorporated herein by reference.

The wireless network 150, such as a cellular network, comprises a mobile switching center (MSC) 52. The MSC 52 is a switch providing services and coordination between wireless user in network 150 and external networks. The MSC 52 may be connected to STP 34 to provide information to the wireline network and receive information from the wireline network. The MSC 52 also communicates with a wireless subscriber, such as wireless telephones 54 and 55. For preparation of billing, the MSCs create call detail records (CDR) similar to the above-described AIN SSPs. The call detail records created by the MSCs are transmitted to the billing system 50 for preparation of periodic wireless subscriber billing.

The signaling protocol used between the components of the wireless network 150 is well known to those skilled in the art. an exemplary signaling protocol is the interim standard 41 (IS-41). The IS-41 standard defines the processed by which wireless providers accomplish signaling between the MSCs and other devices for purposes of inter-system handoff and automatic roaming. For purposes of caller identification information, as described with reference to an exemplary embodiment of the present invention, the IS-41D standard is utilized to address various features such as calling name ID, enhanced 911, and law enforcement intercept. Operation of the IS-41 signaling protocols is well known to those skilled in the art.

The MSC 52 may also be connected to a home location register (HLR) 56. The home location register 56 is a wireless telecommunications component. The HLR 56 is a permanent SS7 database used in cellular networks including the advanced mobile phone system, the global system for mobile communications and the PCS or personal communications system. The HLR 56 may be located as a separate component as illustrated in FIG. 2, or the HLR 56 may be resident on the SCP 42 of the cellular provider of record. The HLR 56 may be used to identify and verify a subscriber, provider of record. The HLR 56 may be used to identify and verify a subscriber, including caller identification information such as name and wireless telephone number of the subscriber. The HLR 56 also contains subscriber data related to features and services subscribed to. The HLR 56 is used not only when a call is being made within an area of coverage supported by a given wireless provider, it may also be used to verify the legitimacy and features subscribed to by a given use when the user is roaming outside that area. Under roaming conditions, a local service provider may query the HLR 56 of another wireless telecommunications service provider via an SS7 data link. Once information on the subscriber is verified, data on the subscriber may be transferred via the SS7 line to the HLR 56 of the local service provider in which the subscriber is roaming.

According to an exemplary embodiment of the present invention, the IdQ 58 or identification queue is a database used in accordance with the present invention for storage of caller identification and related information for subsequent transmission to a wireless telephone 55 after the wireless telephone is registered for service. As should be understood by those skilled in the art, the IdQ 58 may be any suitable form of electronic memory medium for storage and retrieval of caller identification and related data. The IdQ 58 is illustrated in FIG. 2 as a stand alone memory device. As should be understood by those skilled in the art, the IdQ 58 may be resident on the HLR 56, or the IdQ 58 may be resident on another telecommunications component such as the SCP 42.

Operation of an Exemplary Embodiment

Figure 3:
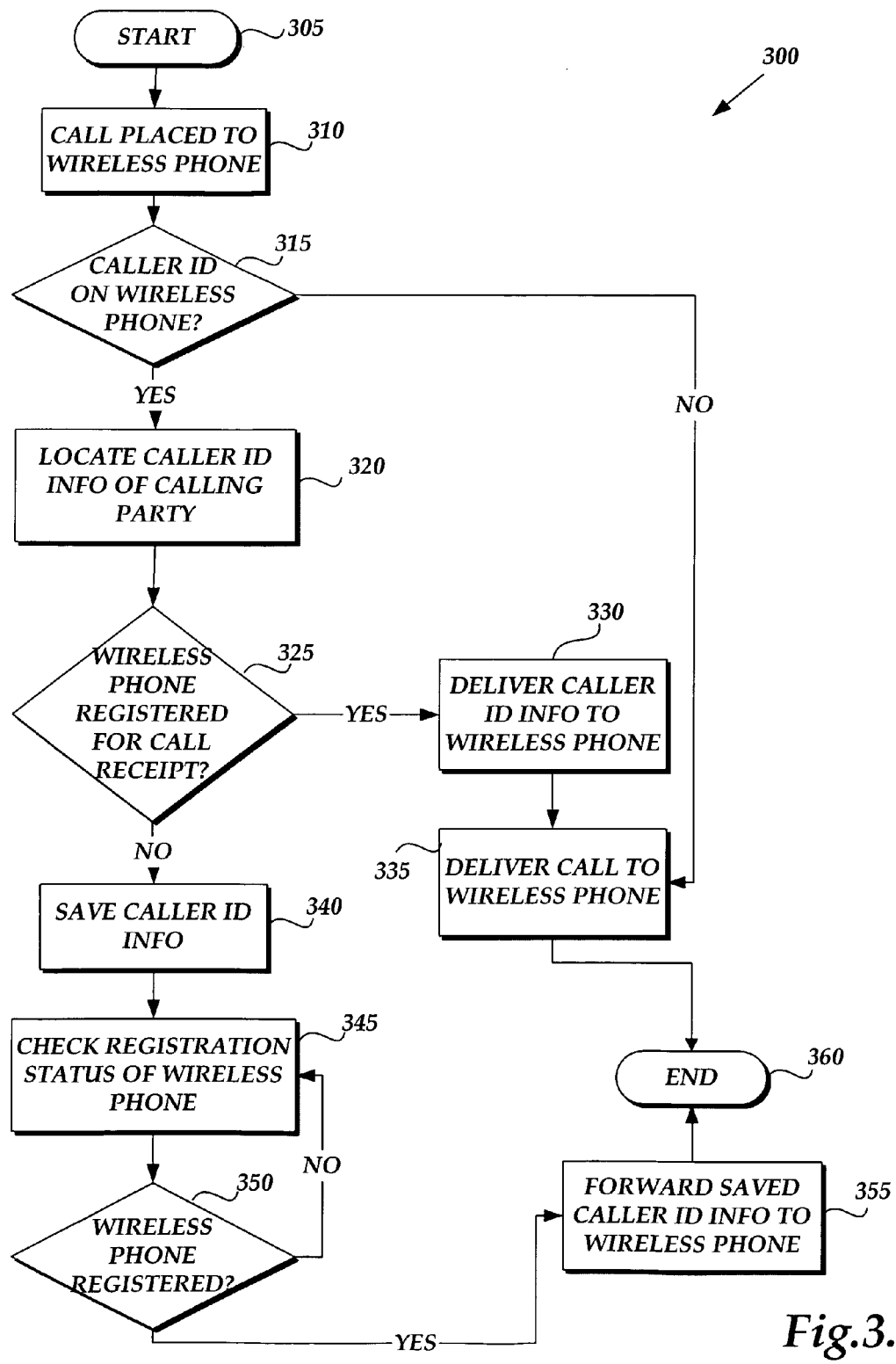
FIG. 3 is a flow diagram illustrating a method for capturing missed call information and delivering that information to a wireless telephone.

Having described an exemplary operating environment and the system architecture of the present invention with reference to FIGS. 1 and 2, FIG. 3 is a flow diagram illustrating a method for capturing missed call information and delivering that information to a wireless telephone when the wireless telephone is in service after an out of service period. The method 300 is described with reference to FIGS. 1–3, and for purposes of the exemplary call flow, assume that a wireless telephone services subscriber operates a wireless telephone 55 on which the subscriber receives caller identification information on calling parties.

The method 300 begins at step 305 and proceeds to step 310 where a call is placed to the wireless telephone 55 from a wireline telephone 21. It should be understood that the call flow described herein is equally applicable to a call initiated from a wireless telephone 54 to a wireline telephone 55. Any differences between call processing of a call directed to a wireless telephone from a wireline telephone versus a call directed to a wireless telephone from a wireless telephone are well known to those skilled in the art.

At step 315, a determination is made as to whether the wireless telephone 55 of the called party is provisioned with caller identification services. As is well known to those skilled in the art, this determination may be made at the SCP 42 by determining features applicable to the telephone line of the called party based on the digits dialed by the calling party. According to the present example, where the telephone call is made to the wireless telephone 55, the features provisioned on the wireless telephone 55 may be determined by checking the features of the wireless telephone 55 at the HLR 56.

If at step 315 a determination is made that the wireless telephone 55 is not provisioned with caller identification services, the method proceeds along the "NO" branch to step 335 and the telephone call is delivered to the wireless telephone 55, and the process ends at step 360. However, if at step 315 the determination is made that the wireless telephone 55 is provisioned with caller identification services, the method proceeds to step 320, and the caller identification information of the calling party is determined. According to an exemplary embodiment, if the calling party is calling from a wireline telephone 21, the caller identification information may be located in the CNAM 48 database through the SCP 42. If the calling party is calling from a wireless telephone 54, the caller identification information may be obtained from the CNAM 48 database or the information may be obtained from the HLR 56.

At step 325, after the caller identification information is obtained for the calling party, a determination is made as to whether the wireless telephone 55 of the called party is registered for receipt of a call. As described above, the wireless telephone 55 will be registered for receipt of a call if the telephone is on and is located within a wireless service area where calls may be routed to the wireless telephone 55. At step 325, a query may be routed from the central office 12 of the wireline telephone 21 to the SCP 42 for a determination as to whether the wireless telephone 55 of the called party is registered for service. Based on the digits dialed by the calling party, the SCP 42 may transmit an IS-41 location request to the HLR 56 to obtain the registration status of the wireless telephone 55. If the call originates from a wireless telephone 54, the query for the status of the wireline telephone 55 may be directed from the MSC 52 to the HLR 56 using the IS-41 signaling protocol.

If the information contained in the HLR 56 indicates that the wireless telephone 55 is in service and ready for receipt of the call, the method proceeds along the "YES" branch to step 330, and the caller identification information is forwarded to the wireless telephone 55. At step 335, the telephone call is delivered to the wireless telephone 55. As should be understood by those skilled in the art, the user of the wireless telephone 55 may answer the telephone, not answer the telephone, or the user may be speaking with another party on the wireless telephone 55. In either case, according to an exemplary embodiment, the caller identification information will be provided to the wireless telephone 55 for presentation to the user of the wireless telephone 55 or for storage in a missed call log of the wireless telephone 55.

Returning back to step 325, if the information contained in the HLR 56 indicates that the wireless telephone 55 is not registered for service, for example, the wireless telephone 55 is turned to the off position, contains a dead battery, or is outside the service area of the wireless telephone 55, the method proceeds along the "NO" branch to step 340. At step 340, an IS-41 message containing the caller identification information for the calling party is forwarded to the IdQ 58 for storage. Caller identification information stored at the IdQ 58 is stored in the order it is received. As should be understood, a number of calls may be place to the wireless telephone during any out of service period.

At step 345, a subsequent IS-41 message is sent to the HLR 56 to determine the registration status of the wireless telephone 55. At step 350, a determination is made as to whether the wireless telephone 55 is registered for service, as described above. If the wireless telephone 55 is still out of service, the method proceeds along the "NO" branch back to step 345 at a regular frequency to check the registration status of the wireless telephone 55. It should be understood that signaling between the wireless telephone 55 and the HLR 56 continually updates the status of the wireless telephone 55. That is, when the telephone is on and in a service area in which it is registered to operate, the telephone periodically signals the HLR 56 to maintain its location and operational status updated with the HLR 56.

At step 350, if the wireless telephone 55 is now registered for service, the method proceeds along the "YES" branch to step 355. At step 355, all saved caller identification information for any calls missed by the wireless telephone 55 during the out of service period are forwarded to the wireless telephone 55. Depending on the wireless telephone model, the user may receive a missed calls message directing the user to a missed calls log where the user will find a listing of all telephone calls missed during the out of service period including the caller identification information for each of the missed calls. According to a preferred embodiment, the caller identification information is listed in the order in which calls were received. As should be understood by those skilled in the art, other information may be provided including the date and time of the missed calls. Accordingly, the user of the wireless telephone 55 may now return all missed calls directed to her wireless telephone 55 during the out of service period.

As should be understood by those skilled in the art, the foregoing call process description is applicable to situations in which the called party is roaming relative to his or her home wireless service provider area. In the case of a roaming called party, the SCP of the local service provider queries the HLR in the roaming service area via an SS7 data link. Once the legitimacy and identification of the roaming called party are determined, all information from the called party's home service area HLR 56 including caller identification information and registration status may be forwarded to the called wireless telephone 55 located in a roaming wireless telephone service area via the SS7 data links from the HLR 56 to an HLR of the roaming wireless telephone service area.

As described, a system and method are provided for capturing and delivering caller identification information for calls directed to a wireless telephone during periods in which the wireless telephone is out of service. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of capturing and delivering caller identification information to a wireless telephone for calls placed to the wireless telephone during periods in which the wireless telephone is out of service, the method comprising:

receiving a call from a calling party directed to the wireless telephone;

obtaining caller identification information on the calling party from one of a caller name database if the calling parting is calling from a wire line and the caller name database or a home location register if the calling parting is calling from a wireless line;

determining whether the wireless telephone is registered to receive calls;

if the wireless telephone is not registered to receive calls, storing the caller identification information and checking the registration status of the wireless telephone at a regular frequency until the status indicates that the wireless telephone is registered to receive calls, the caller identification information being stored in one of a service control point and the home location register; and if the wireless telephone becomes registered to receive calls and if it is determined, based on the wireless telephone model, that the wireless telephone is capable of receiving a missing call message directing a user to a missing call log, forwarding the stored caller identification information to the wireless telephone for storage in the missed call log on the wireless telephone, wherein the missed call log is operative to store the caller identification information corresponding to calls received but not answered while the wireless telephone is registered to receive calls, and the caller identification information corresponding to calls received while the wireless telephone is not registered to receive calls.

2. The method of claim 1, further comprising:
displaying on the wireless telephone an indication of missed calls.

3. The method of claim 1, further comprising:
displaying the caller identification information on the wireless telephone.

4. The method of claim 3, wherein the caller identification information includes the name and telephone number of the calling party.

5. The method of claim 4, wherein the caller identification information further includes the date and time of the call.

6. The method of claim 1, wherein determining whether the wireless telephone is registered to receive calls includes transmitting an IS-41 location request from a wireless switch to a home location register.

7. The method of claim 6, wherein determining whether the wireless telephone is registered to receive calls further comprises:
determining whether the wireless telephone is powered on; and
determining whether the wireless telephone is located in a wireless service area in which the wireless telephone may receive calls.

8. The method of claim 1, wherein obtaining caller identification information on the calling party further comprises:
obtaining caller identification information on the calling party from a calling name database.

9. The method of claim 1, wherein obtaining caller identification information on the calling party further comprises:
obtaining caller identification information on the calling party from a home location register.

10. The method of claim 1, wherein storing the caller identification information further comprises:
sending the caller identification information via an IS-41 signal message to a caller identification queue; and
storing the caller identification information in the caller identification queue.

11. The method of claim 1, wherein after storing the caller identification information, the method further comprising:
determining whether the wireless telephone is re-registered to receive calls.

12. The method of claim 1, wherein determining whether the wireless telephone is registered to receive calls, further includes:
querying a home location register for information indicating that the wireless telephone is registered to receive calls.

13. A method of capturing and delivering caller identification information to a wireless telephone for calls placed to the wireless telephone during periods in which the wireless telephone is out of service, comprising:
receiving at a wireless switch a call from a calling party directed to the wireless telephone;
obtaining caller identification information on the calling party from one of a caller name database if the calling parting is calling from a wire line and the caller name database or a home location register if the calling parting is calling from a wireless line;
querying a home location register for information indicating that the wireless telephone is registered to receive calls;
if the wireless telephone is not registered to receive calls, sending the caller identification information to a caller identification queue for storage, the caller identification information being stored in one of a service control point and the home location register;
if the wireless telephone becomes registered to receive calls and if it is determined, based on the wireless telephone model, that the wireless telephone is capable of receiving a missing call message directing a user to a missing call log, forwarding the stored caller identification information to the wireless telephone for storage in the missed call log on the wireless telephone, wherein the missed call log is operative to store the caller identification information corresponding to calls received but not answered while the wireless telephone is registered to receive calls, and the caller identification information corresponding to calls received while the wireless telephone is not registered to receive calls.

14. The method of claim 13, wherein querying a home location register for information indicating that the wireless telephone is registered to receive calls further comprises:
determining whether the wireless telephone is powered on; and
determining whether the wireless telephone is located in a wireless service area in which the wireless telephone may receive calls.

15. The method of claim 13, wherein prior to forwarding the stored caller identification information to the wireless telephone, the method further comprising:
determining from the home location register whether the wireless telephone has become registered to receive calls.

16. A system of capturing and delivering caller identification information to a wireless telephone for calls placed to the wireless telephone during periods in which the wireless telephone is out of service, comprising:
a wireless switch operative to:
receive a call from a calling party directed to the wireless telephone; and a home location register operative
obtain caller identification information on the calling party from one of a caller name database if the calling parting is calling from a wire line and the caller name database or a home location register if the calling parting is calling from a wireless line,
determine whether the wireless telephone is registered to receive calls, send the caller identification information to a caller identification queue for storage, if the wireless telephone is not registered to receive calls, the caller identification information being stored in one of a service control point and the home location register; and forward the stored caller identification information from the caller identification queue to the wireless telephone for storage in a missed call log on the wireless telephone if the wireless telephone becomes registered to receive calls and if it is determined, based on the wireless telephone model, that the wireless telephone is capable of receiving a missing call message directing a user to the missing call log, wherein the missed call log is operative to store the caller identification information corresponding to calls received but not answered while the wireless telephone is registered to receive calls, and the caller identification information corresponding to calls received while the wireless telephone is not registered to receive calls.

17. The system of claim 16, wherein the home location register is further operative to receive an IS-41 location request from a wireless switch for determining whether the wireless telephone is registered to receive calls.

18. The system of claim 16, wherein the caller identification information includes the name and telephone number of the calling party.

19. The method of claim 18, wherein the caller identification information further includes the date and time of the call.

* * * * *